United States Patent [19]

Cohen et al.

[11] Patent Number: 4,667,721
[45] Date of Patent: May 26, 1987

[54] PNEUMATIC TIRE

[75] Inventors: Albert Cohen, Luxembourg, France; André Lamock, Fauvillers, Belgium; William J. Villamizar, Cruchten, Venezuela

[73] Assignee: The Goodyear Tire & Rubber Company, Akron, Ohio

[21] Appl. No.: 795,808

[22] Filed: Nov. 7, 1985

[51] Int. Cl.$^4$ .......................... B60C 9/08; B60C 15/06
[52] U.S. Cl. ..................... 152/543; 152/546; 152/548; 152/554
[58] Field of Search ............... 152/539, 543, 546, 548, 152/552, 554, 542

[56] References Cited

U.S. PATENT DOCUMENTS

| | | | |
|---|---|---|---|
| 3,557,860 | 1/1971 | Maiocchi | 152/543 X |
| 4,100,955 | 7/1978 | Pottinger et al. | 152/543 X |
| 4,185,677 | 1/1980 | Motomura et al. | 152/543 X |
| 4,215,737 | 8/1980 | Motomura et al. | 152/543 X |
| 4,289,184 | 9/1981 | Motomura et al. | 152/543 X |
| 4,295,511 | 10/1981 | Mezzanotte et al. | 152/555 |
| 4,366,851 | 1/1983 | Makino et al. | 152/543 X |
| 4,377,193 | 3/1983 | Smith | 152/543 |
| 4,398,584 | 8/1983 | Tansei et al. | 152/543 |
| 4,541,467 | 9/1985 | Nakamura et al. | 152/548 |

FOREIGN PATENT DOCUMENTS

| | | | |
|---|---|---|---|
| 0052737 | 6/1982 | European Pat. Off. | |
| 58-89405 | 5/1983 | Japan | 152/543 |
| 1139086 | 1/1969 | United Kingdom | 152/542 |
| 1592122 | 7/1981 | United Kingdom | |
| 2000732 | 3/1982 | United Kingdom | |
| 2127361 | 4/1984 | United Kingdom | |

Primary Examiner—Donald E. Czaja
Assistant Examiner—Ramon R. Hoch
Attorney, Agent, or Firm—L. R. Drayer

[57] ABSTRACT

A radial tire has a carcass ply (17) with turn-up portions (19) extending around each bead (13). On the side of the carcass ply (17) furthest away from each bead (13) are located two reinforcing plies (21,22). Each reinforcing ply (21,22) has portions (21A,22A, and 21B,22B) disposed on each axial side of the associated bead (13). The first portions (21A,22A) of the reinforcing plies adjacent the carcass ply turn-up portions (19) extend radially outwardly thereof, and the second portions (21B,22B) of the reinforcing plies on the other axial side of the bead extend radially outwardly beyond said first portions (21A,22A).

6 Claims, 3 Drawing Figures

PNEUMATIC TIRE

This invention relates generally to pneumatic tires and in particular to truck tires of a radial carcass construction.

Radial carcass truck tires are frequently used under heavy load conditions which place the components within a tire under severe stress. The bead portions of such tires are particularly subject to large deformations which can cause a buildup of heat in the tire and subsequent separation failure. Tires having a radial carcass constructed from aromatic polyamide cords are particularly prone to this type of separation failure.

The applicants have discovered a tire construction with a particularly durable bead portion.

There is provided in accordance with one aspect of the present invention a radial carcass tire comprising at least one carcass ply extending between a pair of annular beads, each of which is located in a respective bead portion of the tire, the carcass ply having a turn-up portion wrapped around each bead, and in each bead portion on the side of the carcass ply furthest away from said bead are located at least two reinforcing plies which each have portions disposed on each axial side of the respective bead and which extend radially outwardly of the bead, in each bead portion the first portions of the reinforcing plies are disposed on the same axial side of the bead as the turn-up portion of the carcass ply and extend radially outwardly beyond said turn-up portion, and the second portions of the reinforcing plies are disposed on the other axial side of the bead from the turn-up and the second portion of each reinforcing ply extends radially outwardly beyond said first portion of the reinforcing ply.

There is provided in accordance with another aspect of the present invention a radial carcass tire comprising at least one carcass ply reinforced by cords of an aromatic polyamide extending between a pair of beads, each of said beads being located in a respective bead portion of the tire, said carcass ply having a turn-up portion wrapped around each bead such that the carcass ply passes by the axially inner side of each bead and a turn-up portion is located on the axially outer side of each bead, and in each bead portion on the side of the carcass ply furthest away from said bead are located two reinforcing plies reinforced by cords of nylon 6 with portions of each reinforcing ply disposed on each axial side of the respective bead and extending radially outwardly of said bead, the cords in each reinforcing ply being arranged at a bias angle of between 25° to 45° with a respective radial plane of the tire with the cords of adjacent reinforcing plies arranged to cross each other in diagonally opposite directions, in each bead portion the first portions of the reinforcing plies are disposed axially outwardly of the turn-up portion of the carcass ply and extend radially outwardly thereof with said first portions arranged to terminate successively radially outwardly further as each reinforcing ply is located further away from the turn-up, and the second portions of the reinforcing plies are disposed axially inwardly of the bead and the second portion of each reinforcing ply extends radially outwardly beyond the first portion of the same carcass ply with said second portions arranged so that the reinforcing ply nearest to the carcass ply extends radially outwardly further than the second portion of the other reinforcing ply.

The terms "axial" and "axially" relate to displacements along the axis of rotation of the tire, and the terms "radial" and "radially" refer to displacements in a plane perpendicular to the axis of rotation of the tire.

Preferably the tire has a turn-up portion from the axially inner side of the bead to the axial outer side.

The invention will be described by way of examples and with reference to the accompanying drawings in which.

Figure 1:
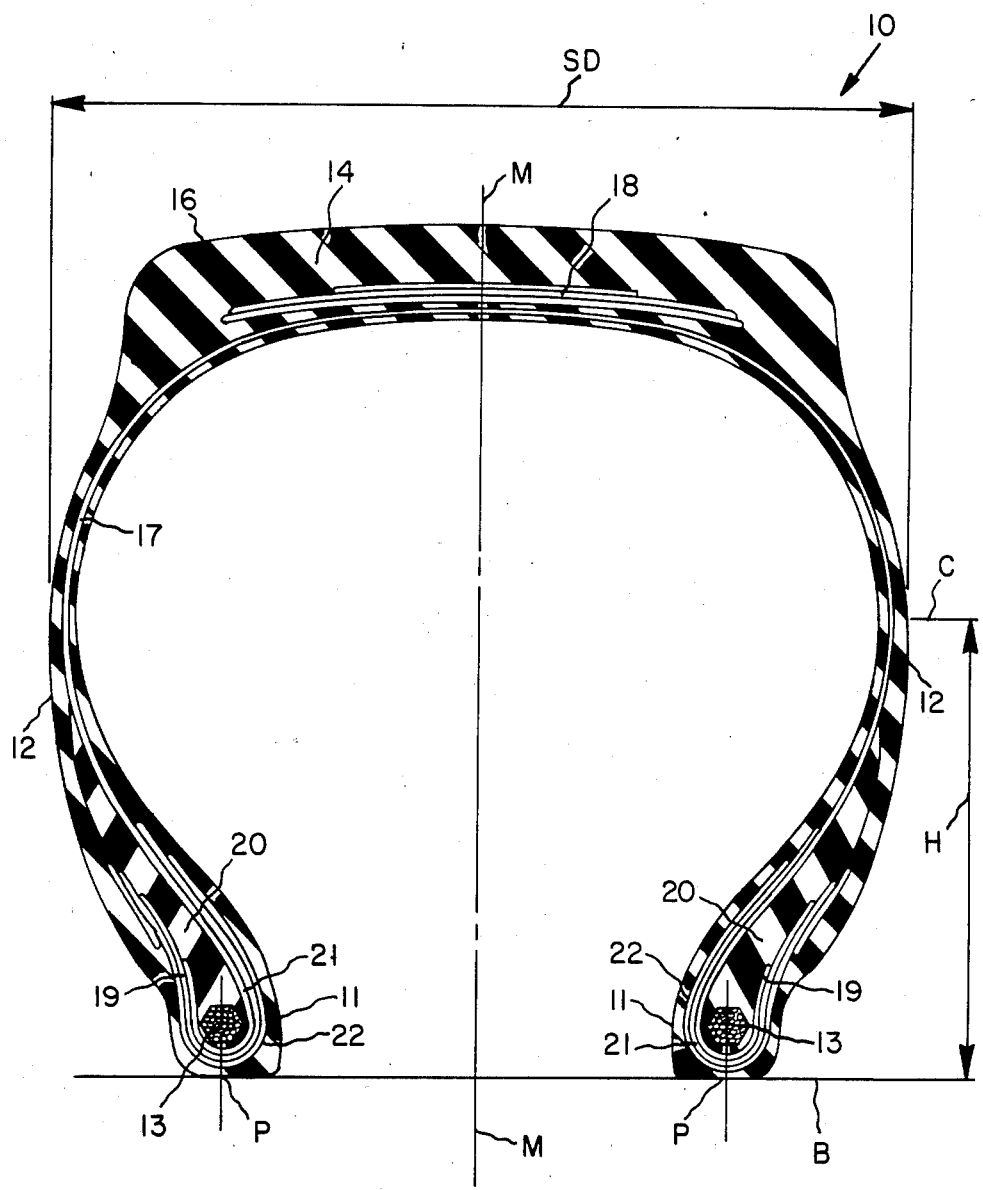
FIG. 1 is a radial cross-sectional view of a tire according to a first embodiment of the present invention.
Figure 2:
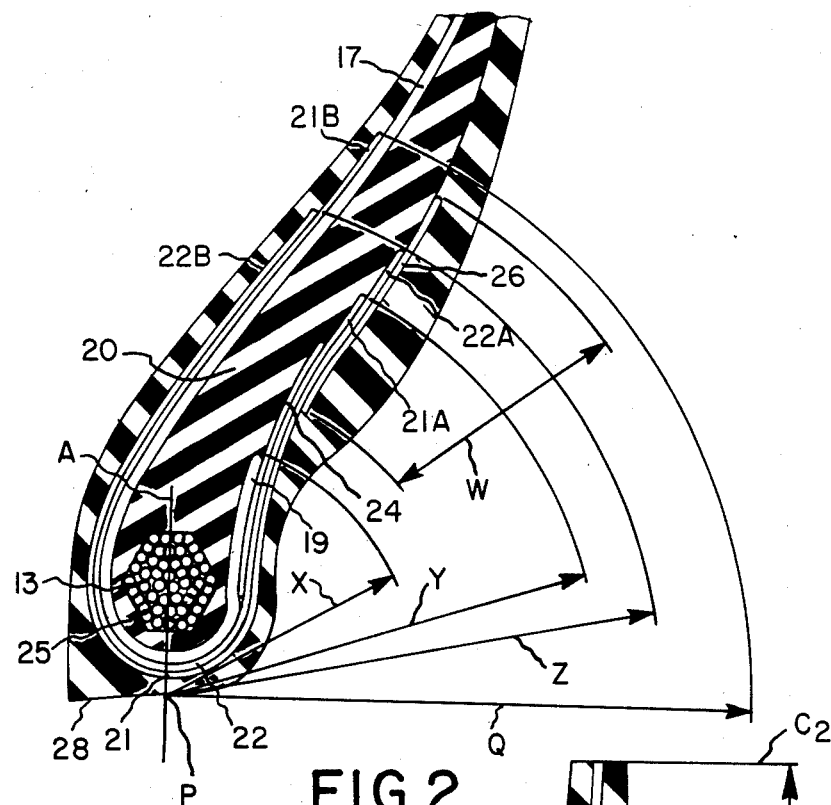
FIG. 2 is an enlarged radial cross-sectional view of a bead portion of the tire of FIG. 1.

With reference to FIGS. 1 and 2, there is illustrated a radial cross-section through a radial carcass truck tire 10 for mounting on a flat base wheel rim. The tire comprises a pair of annular bead portions 11 for engaging with the bead seats and flanges of a wheel rim. Each bead portion 11 contains a substantially inextensible annular bead 13. A sidewall 12 extends radially outwardly from each bead portion 11 into a crown region 14 of the tire 10. The crown region 14 has a ground contacting tread 16 extending circumferentially thereabout.

The tire 10 has a carcass ply 17 extending from one bead 13 to the other bead 13, said carcass ply cords comprising a single elastomeric ply reinforced by cords of a suitable material such as steel, polyester, nylon, or aromatic polyamide, for example Flexter ®. The cords in a carcass ply of aromatic polyamide material may have, for example, a 3000/3 structure, that is a cord comprising 3 filaments of 3000 denier arranged in a density of about 16 ends per inch (600 ends per meter). The cords in the carcass ply 17 are substantially parallel to each other and are orientated at an angle of between 75°–90° with respect to the mid-circumferential plane M—M of the tire. The mid-circumferential plane M—M is a plane normal to the axis of rotation and which is located midway between the beads 13.

The tire is further reinforced in the crown region 14 by an annular belt structure 18 disposed radially outwardly of the carcass ply 17. The belt structure illustrated comprises four superposed unfolded belts, but other belt structures which are practiced in the art could be utilized, for example structures utilizing folded belts or split belts.

Both bead portions 11 are of identical construction and therefore only one of said bead portions will be described. The carcass ply 17 passes on the axially inner side of the bead 13 and has a turn-up portion 19 which is wrapped back around the axially outer side of the bead. The terms "axially inner" and "axially outer" refer to axial positions relative to the mid-circumferential plane M—M.

An annular elastomeric strip 20, sometimes referred to as an apex, having a substantially triangular radial cross-section is located radially outwardly of the bead 13 between the carcass ply 17 and the turn-up portion 19.

On the side of the carcass ply 17 furthest away from the bead 13 are located at least two reinforcing plies 21,22 which are wrapped around the bead 13 and apex strip 20. Each reinforcing ply 21,22 has portions 21A,22B 22A,22B disposed on each axial side of the respective bead 13 that extend radially outwardly beyond the bead 13. An elastomeric strip 24 is inserted between the carcass ply turn-up 19 and the next adjacent reinforcing ply 21 and extends radially outwardly of the carcass ply turn-up. There is a cushioning elastomeric layer 25 disposed between the bead 13 and the carcass ply 17.

Figure 3:
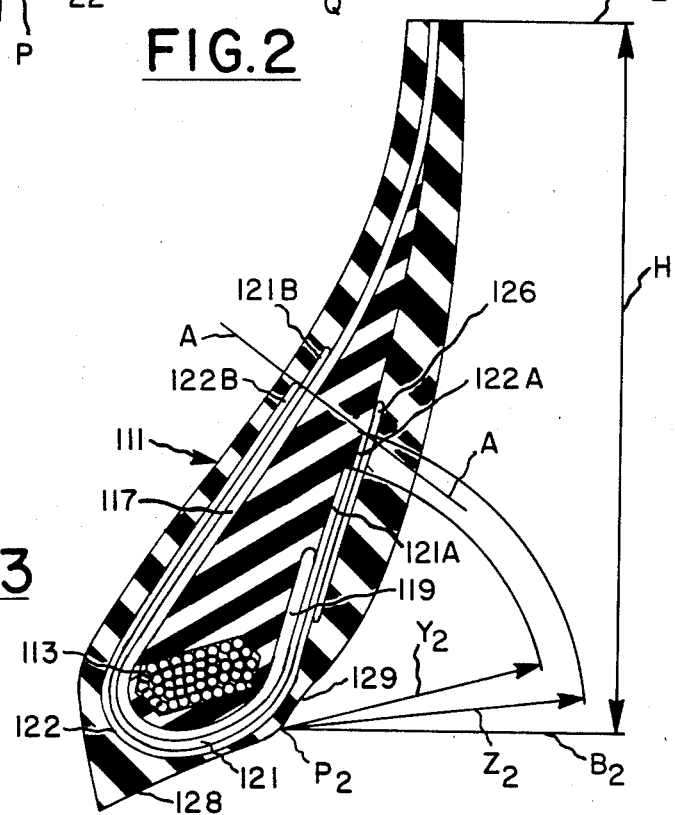
FIG. 3 is an enlarged radial cross-sectional view of a bead portion of a tire according to a second embodiment of the present invention.

In the present embodiment of the invention the turn-up portion 19 of the carcass ply extends radially outwardly to terminate a distance X from a reference point P which is located at the intersection of a plane A perpendicular to the tire's axis of rotation passing through the center of the respective bead 13 and the radially inner surface 28 of the bead portion 11. As used herein and in the claims, all distances from reference point P of FIGS. 1 and 2, and reference point $P_2$ of FIG. 3 are the lengths of radii of circles having centers located at the reference point P,$P_2$ with the circle intersecting an end of the respective component of the tire. The distance X is about 0.25 H, where H is the radial distance between a first line B parallel to the axis of rotation of the tire and passing through said reference point P, and a second line C passing through the tire's sidewalls at a point on the sidewall located at the maximum axial width of the tire section and also parallel to the axis of rotation of the tire.

The axially outer portions 21A and 22A of the two reinforcing plies 21,22 both extend radially outwardly beyond the turn-up portion 19 of the carcass ply and terminate successively radially outwardly further as the reinforcing plies are positioned away from the bead 13. The axially outer portion 21A of the first reinforcing ply 21 which is nearest to the carcass ply 17 extends radially outwardly a distance Y from the reference point P which is between 0.4 and 0.5 H, and preferably about 0.45 H. The axially outer portion 22A of the second reinforcing ply 22 which is furthest away from the carcass ply 17 extends radially outwardly a distance Z from the reference point P, where Z is between 0.45 and 0.55 H, and preferably about 0.5 H. In the preferred embodiment the step-off between the radially outer end of the turn-up portion 19 of the carcass ply and the radially outer end of the axially outer portion 21A of the next adjacent reinforcing ply 21 is at least 20 mm and preferably 30 mm, and the step-off between the radially outer ends of the reinforcing plies 21 and 22, is about 10 mm.

The axially inner portions 21B,22B of the two reinforcing plies both extend radially outwardly of the bead 13 and terminate successively radially outwardly further in the opposite sense to the axially outer portions 21A,22A, that is the axially inner portion 21B of the first reinforcing ply extends outwardly the further of the two. The unfolded length of the first reinforcing ply 21 is about 1.25 H so that after wrapping around the bead 13 the axially inner portion 21B extends outwardly for a distance Q from the reference point P so that Q is between 0.55 and 0.65 H, preferably about 0.6 H. The second reinforcing ply has length of about 1.1 H so that after wrapping around the bead 13 the axially inner portion 22B extends radially outwardly for a distance Z from point P, the same as for the axially outer portion 22A of said second reinforcing ply. Put another way, both ends of the second reinforcing ply 22 are located on a circle having a radius Z with its center located at reference point P.

On the axially outer side of the bead portion 11 adjacent the turn-up portion 19 of the carcass ply there is located axially outwardly of the other two reinforcing plies 21,22 a third reinforcing ply 26 which overlaps the radially outer end portions of the other two reinforcing plies 21 and 22 and extends radially outwardly beyond the other two reinforcing plies 21,22.. The third reinforcing ply has a height W of about 0.3–0.45 H, as measured along a radius having its center located at reference point P, and should extend radially outwardly beyond the second reinforcing ply by about 10 mm, while still being radially inward of the radially outer end of the axially inner portion 21B of the first reinforcing ply 21.

All three reinforcing plies 21,22 and 26 have reinforcing cords therein comprising nylon 6 of the type designated 1260/2, that is two filaments of 1260 denier arranged in a density of 26 ends per inch (1000 ends per meter). The cords in each reinforcing ply are arranged at a bias angle of between 25°–45° with a respective radial plane of the tire, and preferably 30°. The cords of adjacent reinforcing plies are arranged to cross each other in diagonally opposite directions.

With reference to FIG. 3, there is illustrated a bead portion 111 of a radial carcass truck tire suitable for mounting on a drop center tubeless tire wheel rim. The construction of the tire will be substantially similar to that described with reference to FIG. 1 and only the bead portion will be described in detail and then only where it differs substantially from the tire of FIG. 1. In this embodiment of the invention the reference point $P_2$ is located at the intersection of the conical radially inner surface 128 of the bead portion and the curved axially outer surface 129 of the bead portion. With reference to the embodiment shown in FIG. 3, H is the radial distance between a first line $B_2$ that is parallel to the axis of rotation of the tire and passes through the reference point $P_2$, and a second line $C_2$ that is parallel to the axis of rotation of the tire and passes through a sidewall of the tire at the maximum axial width of the tire. As before, the turn-up portion of the carcass ply extends radially outwardly for a distance of about 0.25 H when measured from the reference point $P_2$. The two reinforcing plies 121,122 extend around the bead 113 on both axial sides thereof such that both of the axially inner portions 121B,122B extend radially outwardly a further radial distance than either of the axially outer portions 121A,122A. The axially outer portion 121A of the first reinforcing ply 121 which is nearest to the turn-up portion of the carcass ply terminates at a distance $Y_2$ of between 0.35 and 0.45 H, preferably about 0.4 H from the reference point $P_2$, similar to the embodiment of FIGS. 1 and 2. The axially inner portion 121B of the first reinforcing ply extends radially outwardly further than the axially inner portion 122B of the second reinforcing ply 122. The reinforcing ply 122 furthest away from the carcass ply 117 is arranged so that both ends of the reinforcing ply 122 lie on a straight line A—A which is perpendicular to the carcass ply 117 at the point where the line intersects the carcass ply. The axially outer portion 122A terminates a distance $Z_2$ of between 0.40 and 0.50 H, preferably about 0.45 H from the reference point $P_2$ with its axially inner portion 122B terminating at said line A—A a distance of between 0.43 and 0.53 H, preferably about 0.48 H from the reference point $P_2$.

The third reinforcing ply 126 is located on the axially outer side of the bead 113 and axially outwardly of the two other reinforcing plies 121,122. The third reinforcing ply 126 extends radially so as to overlap the radially outer portion of the turn-up portion 119 of the carcass ply, as well as the radially outer portions of the axially outer portions 121A,122A of the other two reinforcing plies. It extends radially outwardly to terminate radially inwardly of the radially outer end of the axially inner portion 121B of the first reinforcing ply 121.

We claim:

1. A radial carcass tire comprising at least one carcass ply reinforced by cords of an aromatic polyamide extending between a pair of beads, each of said beads being located in a respective bead portion of the tire, said carcass ply having a turn-up portion wrapped around each bead such that the carcass ply passes by the axially inner side of each bead and a turn-up portion is located on the axially outer side of each bead, and in each bead portion on the side of the carcass ply furthest away from said bead are located two reinforcing plies reinforced by cords of nylon 6 with portions of each reinforcing ply disposed on each axial side of the respective bead and extending radially outwardly of said bead, the cords in each reinforcing ply being arranged at a bias angle of between 25° to 45° with a respective radial plane of the tire with the cords of adjacent reinforcing plies arranged to cross each other in diagonally opposite directions, in each bead portion the first portions of the reinforcing plies are disposed axially outwardly of the turn-up portion of the carcass ply and extend radially outwardly thereof with said first portions arranged to terminate successively radially outwardly further as each reinforcing ply is located further away from the turn-up, and the second portions of the reinforcing plies are disposed axially inwardly of the bead and the second portion of each reinforcing ply extends radially outwardly beyond the first portion of the same reinforcing ply with said second portions arranged so that the reinforcing ply nearest to the carcass ply extends radially outwardly further than the second portion of the other reinforcing ply, and in each bead portion the reinforcing ply furthest away from the bead is disposed such that both of its ends are located on a circle having its center located at the intersection of an axial plane passing through the center of the respective bead, and the radially inner surface of the bead portion.

2. A radial carcass tire as claimed in claim 1 wherein the reinforcing ply furthest away from the carcass ply is disposed such that its first and second portions both terminate on the same straight line, said line being perpendicular to the carcass ply at the point where it intersects the carcass ply.

3. A radial carcass tire as claimed in claim 2 further comprising a third reinforcing ply reinforced by nylon 6 cords disposed axially outwardly of the other two reinforcing plies, said third reinforcing ply overlapping the turn-up portion and the other two reinforcing plies and extending radially outwardly thereof.

4. A radial carcass tire as claimed in claim 1 further comprising a third reinforcing ply reinforced by nylon 6 cords disposed axially outwardly of the other two reinforcing plies, said third reinforcing ply overlapping the other two reinforcing plies and extending radially outwardly thereof.

5. A radial carcass tire as claimed in claim 1 wherein the ends of said reinforcing plies are disposed such that as measured from a reference point P located at the intersection of a plane perpendicular to the tire's axis of rotation passing through the center of the respective bead and the radially inner surface of the bead portion:
   (a) an end of the first portion of the reinforcing ply that is nearest to the carcass ply is located a distance of between 0.4 H and 0.5 H from the reference point P;
   (b) an end of the fitst portion of the reinforcing ply that is furthest away from the carcass ply is located a distance of between 0.45 H and 0.55 H from the reference point P; and
   (c) an end of the second portion of the reinforcing ply that is nearest to the first carcass ply is located a distance of between 0.55 H and 0.65 H from the reference point P;

wherein H is the radial distance between a first line that is parallel to the axis of rotation of the tire and passes through the reference point P, and a second line that is parallel to the axis of rotation of the tire and passes through a sidewall of the tire at the maximum axial width of the tire.

6. A radial carcass tire as claimed in claim 2 wherein the ends of said reinforcing plies are disposed such that as measured from a reference point $P_2$ located at the intersection of a conical radially inner surface of the bead portion and a curved axially outer surface of the bead portion:
   (a) an end of the first portion of the reinforcing ply which is nearest to the turn-up portion of the carcass is located a distance of between 0.35 H and 0.45 H from the reference point $P_2$; and
   (b) an end of the first portion of the reinforcing ply that is furthest from the turn-up portion of the carcass ply is located a distance of between 0.40 H and 0.50 H from the reference point $P_2$;

wherein H is the radial distance between a first line that is parallel to the axis of rotation of the tire and passes through the reference point $P_2$, and a second line that is parallel to the axis rotation of the tire and passes through a sidewall of the tire at the maximum axial width of the tire.

* * * * *